Nov. 24, 1942.  F. W. CURTIS  2,302,744
SPINDLE CONTROL FOR MACHINE TOOLS
Filed May 5, 1941  3 Sheets-Sheet 3
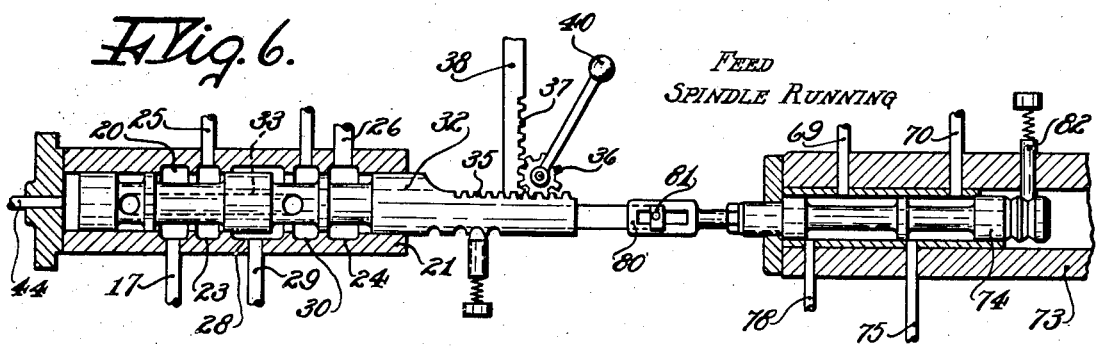
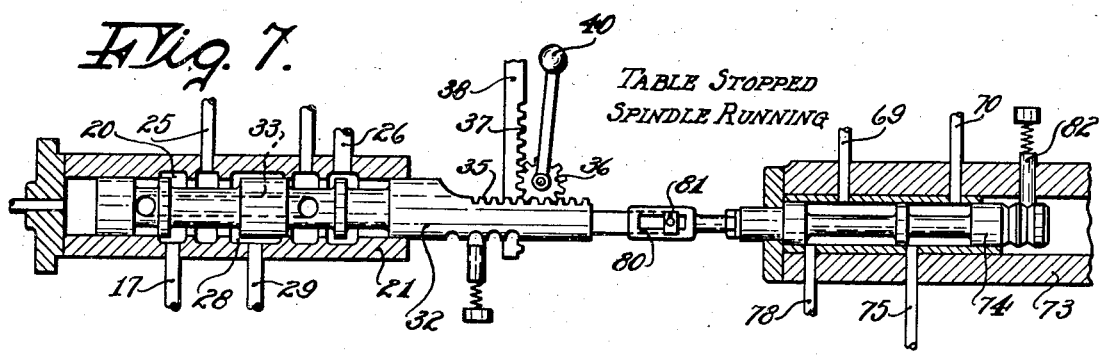
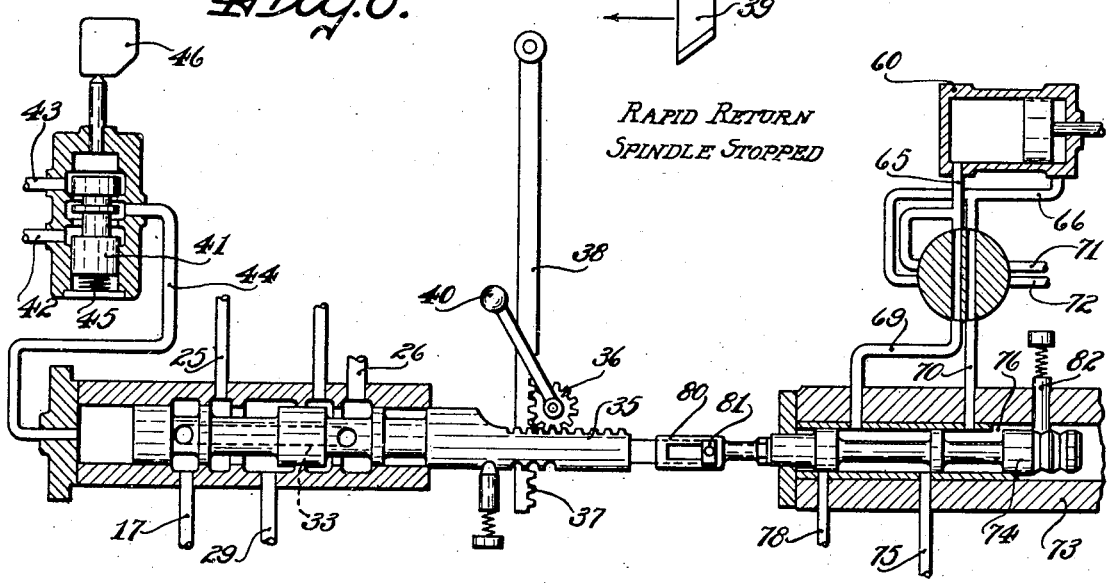
INVENTOR
FRANK W. CURTIS
BY Chapin + Neal
ATTORNEYS Patented Nov. 24, 1942

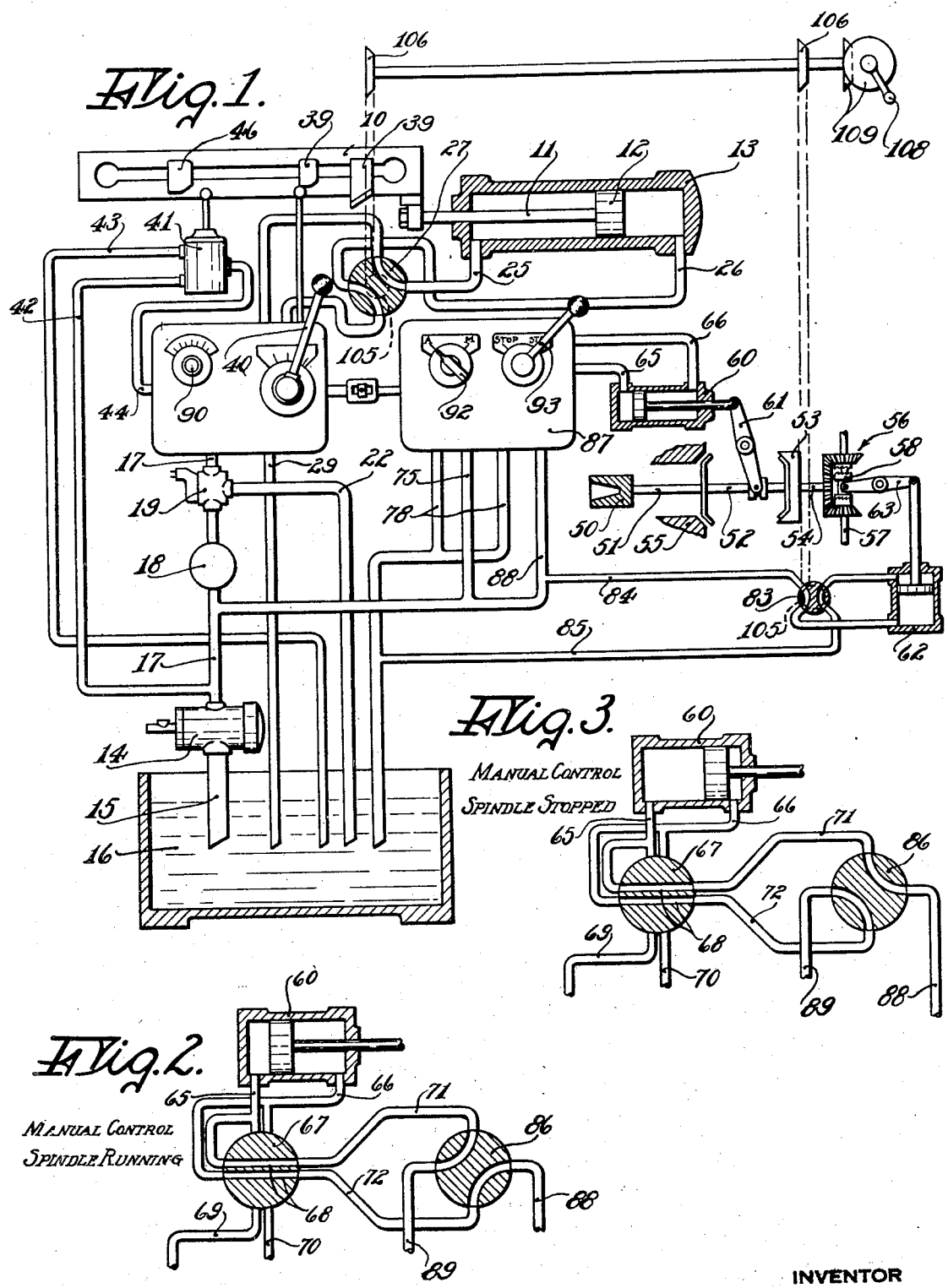

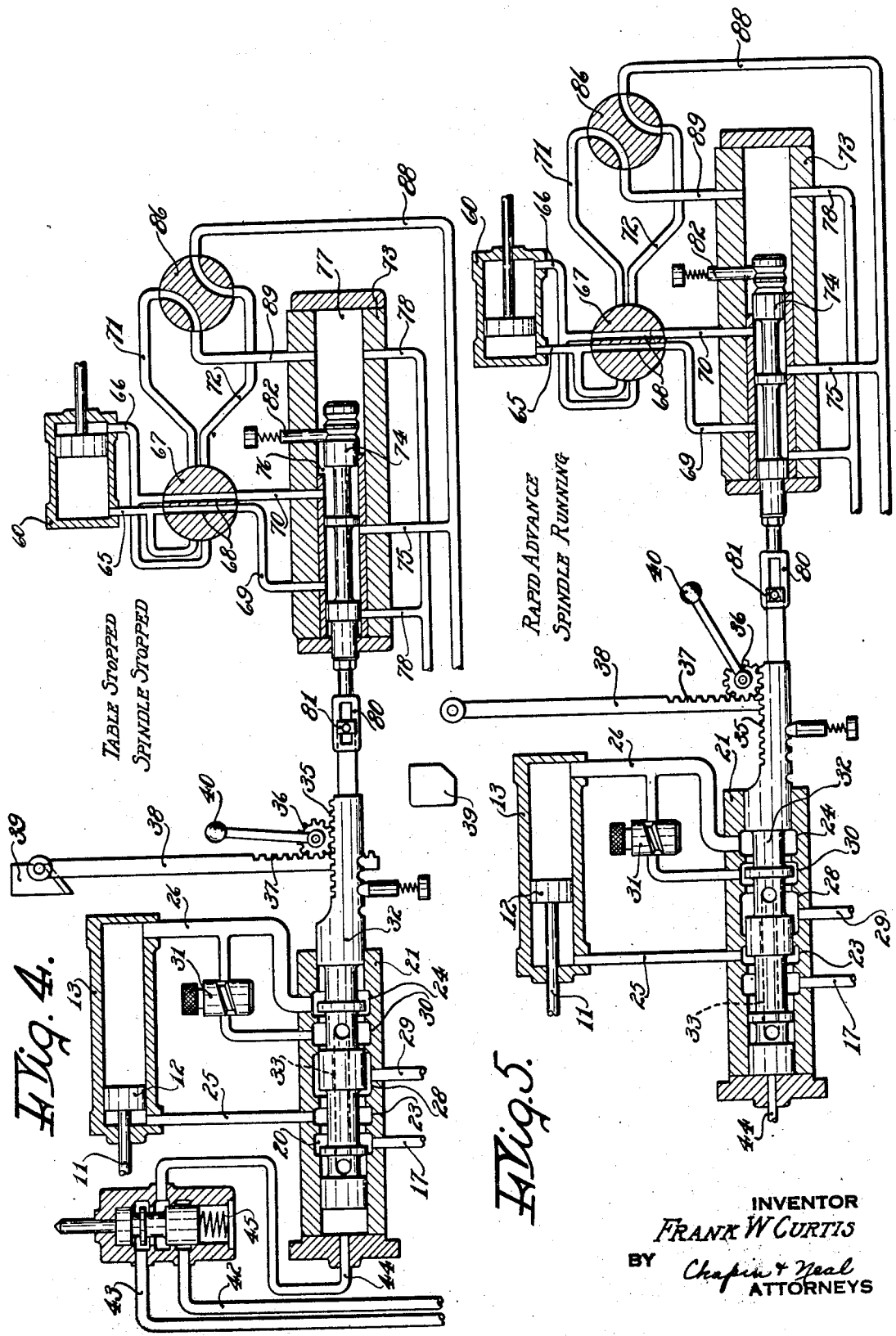

2,302,744

UNITED STATES PATENT OFFICE 2,302,744

SPINDLE CONTROL FOR MACHINE TOOLS

Frank W. Curtis, Springfield, Mass., assignor to Van Norman Machine Tool Company, Springfield, Mass., a corporation of Massachusetts Application May 5, 1941, Serial No. 391,827

12 Claims. (Cl. 90—21.5)

In certain types of machine tools such as milling machines it is desirable to provide an automatic control for starting and stopping the rotation of the tool-carrying spindle in some predetermined relation to the travel of the work carrying table; and to permit this automatic control to be superseded at will by a manual control. The present invention relates to a spindle control of this general type, having for one object the provision of a mechanism at once simpler and more positive in action than those previously suggested. A further object is to provide a spindle control especially adapted for panel mounting on the frame of a machine, and in particular to divide the table and spindle controls between two panels so that machines can be furnished with or without the automatic control merely by replacing the spindle control panel by another having manual control mechanism only.

The invention will now be described with reference to the accompanying drawings which show the control applied to the table and spindle of a milling machine, and in which Fig. 1 is a diagrammatic view of the control mechanism showing the panel mounting;

Figs. 2 and 3 are details showing the selector valve set to permit manual control of the spindle clutch; and Figs. 4 to 8 are diagrammatic views of the valve mechanism in different positions.

The table controlling mechanism is of the hydraulic type described in my prior application Serial No. 380,897, filed Feb. 27, 1941; and will be but briefly considered here apart from its connection with the spindle control. The table 10 is coupled to the rod 11 of a piston 12 running in an hydraulic cylinder 13. A pump 14, preferably of the constant delivery type, has its inlet 15 dipping into a sump 16, and its outlet connection 17 joined through a loading valve 18 and a relief valve 19 with a port 20 in the table control valve chamber 21. The loading valve merely serves to maintain a minimum pressure in the line between it and the pump irrespective of the setting of the valve mechanism, so that there will at all times be sufficient pressure to operate certain servo-motors. The relief valve is connected by a line 22 with the sump and limits the maximum pressure which can exist in the line 17.

A port 23 and a port 24 in the valve chamber are joined by pipes 25 and 26 with opposite ends of the cylinder 13 through a four-way valve 27 serving as a cycle inverter. Valve 27 is omitted from all views except Fig. 1 in order to simplify the disclosure. A wide port 28 is coupled to the sump by a pipe 29, and a port 30 adjacent port 24 is joined to the pipe 26 through an adjustable throttle 31. At is fully described in my prior application referred to, the valve piston 32 is provided with a series of cannelures and with a central passage 33 so that the pressure fluid can be supplied to the cylinder 13 under different conditions.

In Figs. 4 and 7 the valve connects ports 20 and 28, short-circuiting the pump and freeing the piston 12 from pressure in either direction. The table is started in motion by shifting the valve to its extreme left-hand position, as shown in Fig. 5, connecting pipes 17 and 25 to admit fluid under pressure at the left of the piston and allowing the fluid exhausted from the cylinder to pass directly from pipe 26 to pipe 29 without going through the throttle. The table is thus driven at rapid traverse in a forward direction. In Fig. 6 the pipes 17 and 25 are connected as before, but the port 24 is blocked off forcing the exhausted liquid to flow through the throttle 31 on its way to the sump. This gives a slower feeding movement to the table at a rate controlled by the setting of the throttle. In Fig. 8 the valve piston is shifted to its extreme right hand position, coupling pipes 17 and 26 through the central passage 33 and venting pipe 29 directly to the sump. This causes motion of the piston in the reverse direction, and at a rapid traverse rate since the throttle is by-passed.

To actuate the valve piston two means are provided. The stem of the piston is formed with rack teeth 35 engaging a wide faced pinion 36 also meshing with rack teeth 37 on a vertically movable rod 38 which may be moved up or down as required by dogs 39 on the table. Pinion 36 is also provided with a handle 40 to permit manual actuation of the valve. By this means the table may be driven forwardly in any desired succession of feed and rapid traverse rates, and may be brought to a stop. Since to reach the return setting the valve must pass through a stop position in which the table comes to rest, table dogs 39 cannot be used to push the valve piston into the return setting. To do this a pilot valve 41 is coupled to the line 17 below the loading valve by a pipe 42, to the drain by a pipe 43, and to the left hand end of the valve casing by a pipe 44. Normally the pilot valve is held in the position of Fig. 4 by a spring 45, but may be temporarily lowered by table dogs 46 as in Fig. 8 to permit pressure fluid to act on the left hand end of the valve piston and shift it into the position shown.

The machine is provided with a spindle of any desired type indicated conventionally at 50. Its drive shaft 51 is connected by a clutch 52 with a driving clutch element 53 on a shaft 54 or with a stationary brake shoe 55. Shaft 54 is driven through a conventional reversing gear 56 from a shaft 57, a shiftable clutch 58 serving to drive shaft 54 in either direction desired. The mechanical details of the spindle drive form no part of the invention and they have therefore been shown conventionally only. Clutch 52 has been shown as operated by a servo-motor 60 and an intermediate rocker 61, and clutch 58 by a servo-motor 62 and an intermediate rocker 63. The description of the control of servo-motor 60 will be taken up first.

From the two ends of the servo-motor cylinder, pipes 65 and 66 each divide to enter the barrel of a cylinder selector valve 67 at two ports about 90° apart. Through passages 68 in the valve barrel connect pipes 65 and 66 with pipes 69 and 70 when the valve is in the automatic setting of Fig. 4; and with pipes 71 and 72 when the valve is in the manual setting of Fig. 2. Pipes 69 and 70 connect at spaced points with a valve casing 73 in which slides a piston valve 74 coupled as will be described with the piston valve 32. In the position of Fig. 4 the piston 74 connects pipe 69 with a pipe 75 coming from line 17 below the loading valve, and by a passage 76 couples pipe 70 with a space 77 at the end of the valve which is always connected to the sump through a pipe 78. In the position of Fig. 5 the valve connects pipe 69 with the sump through pipe 78, and pressure pipe 75 with pipe 70. Passage 76 is at this time closed. The effect on the servo-motor will be clear from the drawings, the right hand position of the valve causing the piston of the servo-motor to be displaced to the right and thus to stop the rotation of the spindle, and the left hand setting of the valve causing the spindle driving clutch to be engaged.

The spindle of valve 74 extends outside of the casing and is formed with a slotted end 80 into which fits a block 81 secured to the end of piston valve 32. The latter valve has four positions, while the spindle control valve has but two; the slot and block forming a lost motion connection with the slot about three times as long as the block. When the table valve is put in rapid advance position, the block contacts the left hand end of the slot and draws the spindle control valve into its spindle driving position (Figs. 4 and 5). If the table valve is pushed from rapid advance to feed or to stop, and shifted in either direction between these three settings, the spindle valve will not be affected, being held in position by a detent 82 (Figs. 5 to 7). If, however, the table valve is moved to rapid return position (Fig. 8), the block will contact the end of the slot and shift the spindle valve to its spindle stopping position. The result is that the spindle will operate during the advance movement of the table at either feed or rapid traverse rate, and even during an interruption in this forward movement (Fig. 7); but will be stopped during the return stroke of the table and will remain stopped when the table is brought to rest after this return stroke (Fig. 4). The condition of the spindle clutch when the table is at rest thus depends upon whether the table was going forward or back at the time it was brought to rest, as has been shown in the two stop positions of Figs. 2 and 7.

It is not necessary to alter the spindle control valve or its connection to the table valve if the cycle is to be inverted. The cycle inverting valve 27 is a simple four-way valve having the sole function of changing the connection of the pipes 25 and 26 to the ends of the cylinder 13. Assuming that the table has its feed stroke in moving from left to right, the cycle-inverter may be thrown to place the feed stroke during the right to left travel. This makes no change in the table valve nor in its relation to the spindle valve, since the spindle will be stopped during the return stroke irrespective of the direction in which this is caused to take place by the cycle-inverter. It is, however, generally desirable to reverse the direction of rotation of the spindle when the direction of the feed stroke is reversed. This may be done by a separate adjustment of the spindle reversing clutch 58, but it is convenient to control the reversing servo-motor 62 by a four-way valve 83 having a pressure pipe 84 and a drain pipe 85. By coupling this valve to the valve 27, as by coupling them for actuation from the same shaft, the cycle and spindle will be reversed together. Thus as indicated in Fig 1, each valve 27 and 83 may be provided with a bevel gear 105 which meshes with bevel gears 106 carried in shaft 107. A manual control 108 is connected to shaft 107 as by gears 109 for adjustment of the valves. It will be understood that the table dogs will be rearranged as necessary and the cutter replaced by one of opposite hand when the direction of feed is to be changed.

Manual control of the spindle can be obtained by turning the selector valve 67 to the position of Figs. 2 and 3. The pipes 71, 72 are then connected with a four-way valve 86 mounted, together with the spindle control valve and the selector valve, on the spindle control panel 87. A pipe 88 connects valve 86 at all times with the pressure line 17, and a pipe 89 connects it to the chamber 77 which, as stated above, is always connected to the sump. The selector valve 67, as will be clear from the drawings, has the function of connecting the servo-motor 60 either to the automatic valve 74 or to the manual valve 86, and at the same time to disconnect it from the other valve. Thus in the position of Fig. 5 the manual valve 86 can be moved at will without producing any effect, and in the position of Fig. 2 the automatic valve 74 moves back and forth without causing operation of the servo-motor.

The handle 46 and the stem 90 of the throttle project through the table control panel 91 to a position readily accessible at the front of the machine. A handle 92 projects through the spindle control panel 87 from the selector valve 67 and a handle 93 from the manual valve 86. The two panels are preferably mounted separately, this being readily permitted by the lost motion connection between the two valves, so that if no automatic spindle control is desired a panel containing merely the manual valve may be substituted.

What I claim is:

1. In a machine tool having an hydraulically reciprocable table and a spindle rotatable through a train including an hydraulically actuated motion interrupting clutch, a valve having a plurality of positions for controlling the reciprocation of the table at a plurality of rates in at least one direction, a second valve having two positions for holding the hydraulically actuated clutch either engaged or disengaged, and a lost motion connection between the valves to actuate the second from the first only when the first valve is shifted between positions which change the direction of movement of the table.

2. In a machine tool having an hydraulically reciprocable table and a spindle rotatable through a train including an hydraulically actuated motion interrupting clutch, a valve having a plurality of positions for controlling the reciprocation of the table at a plurality of rates in at least one direction, a second valve having two positions for holding the hydraulically actuated clutch either engaged or disengaged, and a lost motion connection between the valves to actuate the second from the first.

3. In a machine tool, a table, a spindle, mechanism for reciprocating the table in opposite directions and at a plurality of speeds in at least one direction, means for driving the spindle including a motion interrupting clutch, a single control for said mechanism to change both its rate and direction, a control for said clutch, and a lost motion connection between the two controls whereby the second will be operated positively from the first but the first may assume a plurality of positions without affecting the second.

4. In a machine tool, a table, a spindle, mechanism for reciprocating the table in opposite directions and at a plurality of speeds in one direction, means for driving the spindle including a motion interrupting clutch, a single control for said mechanism having successive positions causing rapid traverse forward, feed forward, stop, and rapid traverse reverse, a control for the clutch, and a lost motion connection between the controls causing operation of the second control in a direction to cause starting and stopping of the spindle when the first control is placed respectively in its two extreme positions but causing no change in the second control when the first control is moved to any intermediate position.

5. In a machine tool, a spindle, a spindle transmission including a motion interrupting clutch, a table, hydraulic mechanism for reciprocating the table and including a fluid source, a rate-direction valve, a single cycle-inverting valve and an hydraulic motor in the order named, said rate-direction valve being adjustable to cause the table to make a forward and a reverse stroke and to stop the table during either stroke, said forward stroke consisting of a forward rapid approach and a forward feed and said return stroke consisting of a rapid return, said cycle-inverting valve being arranged to invert the directions of the forward and reverse strokes as determined by the rate-direction valve, and connections between the motion interrupting clutch and the rate-direction valve to cause engagement of the clutch on the forward stroke of the table and during stopping of the table during that stroke and to cause disengagement of the clutch during the reverse stroke, whereby the directions of the respective strokes of the table as well as the direction of table motion during which the spindle rotation is stopped may be inverted by adjustment of the single cycle-inverting valve.

6. In a machine tool, a spindle, a spindle transmission including a motion interrupting clutch, a table, a final driver for the table, a table transmission for reciprocating the table, and including means adjustable to cause the table to move through a cycle comprising a forward and a reverse stroke and to stop the table during either stroke, said forward stroke comprising both forward rapid approach and forward feed motions and said return stroke comprising a rapid return motion, a cycle-inverter connecting the table transmission and final driver and arranged to invert the direction of motion of the table as determined by the table transmission to thereby invert the cycle of the table, and connections between the motion interrupting clutch and the table transmission to cause engagement of said clutch on the forward stroke of the table and during stopping of the table during that stroke and to cause disengagement of the clutch during the reverse stroke of the table, whereby the direction of motion of the table during forward and reverse strokes may be inverted to invert the work cycle with the spindle clutch disengaged during the reverse stroke by adjustment of the cycle-inverter and without adjustment of the connection between the motion interrupting clutch and table transmission.

7. In a machine tool a spindle, a spindle transmission including a motion interrupting clutch; a table; hydraulic mechanism for reciprocating the table and including a fluid source, a rate-direction valve and an hydraulic motor in the order named, said rate-direction valve being adjustable to a plurality of positions respectively determinative of a plurality of rates and directions of table motion; hydraulic mechanism for shifting the motion interrupting clutch and including a shiftable member; a pair of hydraulic circuits each consisting of conduits extending from said fluid source for delivery of fluid to and from said source, a reversing valve connected to the conduits, and channels extending from the respective reversing valve; a single selector valve for connecting the shiftable member selectively to the channels of either one or the other of said hydraulic circuits for movement thereby, one of said reversing valves being connected to said rate-direction valve for actuation thereby and the other of said reversing valves being manually operable.

8. In a machine tool, a spindle, a spindle transmission including an hydraulically actuated motion interrupting clutch, a reciprocable table, hydraulic transmission mechanism for reciprocating the table and including a rate-direction valve shiftable between a plurality of positions respectively determinative of different directions and a plurality of rates of table reciprocation, a second and a third valve each movable between two positions for hydraulic actuation of the motion interrupting clutch, and a selector valve for selectively connecting one or the other of said last mentioned valves for actuation of the motion interrupting clutch, said second valve being connected to the rate-direction valve for actuation thereby and said third valve being manually operable, whereby when the selector valve is connected for operation of the motion interrupting clutch by said second valve for automatic control of the clutch from the table rate-direction valve the third valve is rendered ineffective to interrupt spindle rotation.

9. In a machine tool, a rotatable spindle, a spindle transmission for rotation of the spindle and including a motion interrupting clutch, a reciprocable table, hydraulic transmission mechanism for reciprocating the table and including a rate-direction valve shiftable between a plurality of positions respectively determinative of different directions and a plurality of rates of table reciprocation, a first and a second shiftable means alternatively controlling the motion interrupting clutch to establish or interrupt spindle motion, selector means for connecting one or the other of said two means to said motion interrupting clutch for actuation thereof, said first means being connected to the rate-direction valve for automatic operation thereby as said valve is moved from one to another of its positions and said second means being manually operable, whereby when said selector means is effective to couple said first and automatic means for control of the motion interrupting clutch the second and manual means is rendered ineffective.

10. In a machine tool, a rotatable spindle, a spindle transmission for rotation of the spindle and including a motion interrupting clutch and a spindle reversing clutch, a table, hydraulic mechanism for reciprocating the table and including a fluid source, a rate-direction valve, a single cycle-inverting valve and an hydraulic motor in the order named, said rate-direction valve being shiftable to cause the table to make a forward and a reverse stroke and to stop the table during either stroke, said forward stroke including forward rapid approach and forward feed motions and said reverse stroke comprising rapid return motion, said cycle-inverting valve being arranged to invert the directions of the forward and reverse strokes as determined by the rate-direction valve, connections between the motion interrupting clutch and the rate-direction valve to cause engagement of said clutch on the forward stroke of the table and during stopping of the table during that stroke and to cause disengagement of the clutch during the reverse stroke, a second hydraulic mechanism coupled to said fluid source for operation of the spindle reversing clutch, and including a member shiftable between a plurality of positions to reverse the direction of spindle rotation, said last named member being coupled to the cycle inverter for synchronous operation thereby to shift the member from one position to another whereby the directions of the respective strokes of the table as well as the direction of table motion during which rotation of the spindle is stopped may be inverted and the direction of spindle rotation reversed by adjustment of the single cycle inverting valve.

11. In a machine tool, a spindle, a spindle transmission including a motion interrupting clutch and a spindle reversing clutch, a table, a final driver for the table, a table transmission for reciprocating the table, and including means adjustable to cause the table to move through a cycle comprising a forward and a reverse stroke and to stop the table during either stroke, said forward stroke comprising both forward rapid approach and forward feed motions and said return stroke comprising a rapid return motion, a single cycle-inverter connecting the table transmission and final driver and arranged to invert the direction of motion of the table as determined by the table transmission to thereby invert the cycle of the table, connections between the motion interrupting clutch and the table transmission to cause engagement of said clutch in the forward stroke of the table including during stopping of the table during that stroke and to cause disengagement of the clutch during the reverse stroke of the table, a member shiftable between two positions for operating the spindle reversing clutch and means coupling said member to the cycle-inverter for synchronous operation thereby to shift the member from one position to the other when the cycle inverter is shifted to invert the cycle of the table whereby the directions of the respective strokes of the table as well as the direction of table motion during which rotation of the spindle motion is stopped may be inverted and the direction of spindle rotation reversed by adjustment of the single cycle-inverter.

12. In a machine tool having a table, an hydraulic transmission for reciprocating the table, a spindle, a spindle transmission for rotating the spindle and including a motion interrupting clutch for interrupting or establishing spindle rotation; a first control panel, a single unitary valve carried by said panel and shiftable between a plurality of positions, respectively determinative of a plurality of rates and directions of table motion, a second control panel, a first and a second valve carried by the second control panel and each shiftable between two positions for operation of the motion interrupting clutch, a selector valve carried by the second panel and manually shiftable to connect one or the other of the last two mentioned valves to the motion interrupting clutch for operation of the same, and a lost motion connection extending from the single unitary valve on the first panel to the first valve on the second panel and arranged to move the first valve on the second panel only when the single unitary valve on the first panel is moved to change direction of movement of the table.

FRANK W. CURTIS.